(12) United States Patent
Mao et al.

(10) Patent No.: US 12,689,754 B2
(45) Date of Patent: *Jul. 21, 2026

(54) VIDEO STREAM DECODING METHOD AND APPARATUS, TERMINAL DEVICE, AND STORAGE MEDIUM

(71) Applicant: TENCENT TECHNOLOGY (SHENZHEN) COMPANY LIMITED, Shenzhen (CN)

(72) Inventors: Jiangyun Mao, Shenzhen (CN); Tao Yang, Shenzhen (CN); Zhibo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 99 days.

This patent is subject to a terminal disclaimer.

(21) Appl. No.: 18/651,813

(22) Filed: May 1, 2024

(65) Prior Publication Data

US 2024/0364905 A1 Oct. 31, 2024

Related U.S. Application Data

(63) Continuation of application No. 17/500,884, filed on Oct. 13, 2021, now Pat. No. 12,003,743, which is a
(Continued)

(30) Foreign Application Priority Data

Jul. 15, 2019 (CN) .......................... 201910636848.6

(51) Int. Cl.
*H04N 19/42* (2014.01)
*G06T 1/20* (2006.01)
(Continued)

(52) U.S. Cl.
CPC ............... *H04N 19/42* (2014.11); *G06T 1/20* (2013.01); *H04N 19/127* (2014.11); *H04N 19/156* (2014.11); *H04N 19/172* (2014.11)

(58) Field of Classification Search
CPC .... H04N 19/42; H04N 19/127; H04N 19/156; H04N 19/172; G06T 1/20
(Continued)

(56) References Cited

U.S. PATENT DOCUMENTS 9,311,721 B1 * 4/2016 Loughry ................... G06T 1/20
2007/0121720 A1 5/2007 Yamane et al.
(Continued)

FOREIGN PATENT DOCUMENTS

CN 101668206 A 3/2010
CN 102148959 A 8/2011
(Continued)

OTHER PUBLICATIONS

The State Intellectual Property Office of the People's Republic of China (SIPO) Office Action 1 for for 201910636848.6 Mar. 19, 2021 9 Pages (including translation).
(Continued)

*Primary Examiner* — Allen C Wong
(74) *Attorney, Agent, or Firm* — Anova Law Group, PLLC

(57) ABSTRACT

A video stream decoding method is provided. The video stream decoding method is performed by a terminal device. The method includes receiving a plurality of video streams from a monitoring device; generating a plurality of threads in a thread pool corresponding to a graphics processing unit (GPU); and transmitting, according to the plurality of threads, the plurality of video streams to the GPU for video decoding processing to obtain a plurality of pieces of decoded video data.

20 Claims, 4 Drawing Sheets

Related U.S. Application Data continuation of application No. PCT/CN2020/096511, filed on Jun. 17, 2020.

(51) Int. Cl.
| | | |
|---|---|---|
| *H04N 19/127* | (2014.01) | |
| *H04N 19/156* | (2014.01) | |
| *H04N 19/172* | (2014.01) | |

(58) Field of Classification Search
USPC .................................................... 375/240.02
See application file for complete search history.

(56) References Cited

U.S. PATENT DOCUMENTS

| | | | |
|---|---|---|---|
| 2011/0010607 A1* | 1/2011 | Raveendran ............ | H04L 47/38 |
| | | | 714/776 |
| 2013/0024332 A1 | 1/2013 | Cai et al. | |
| 2017/0214930 A1 | 7/2017 | Loughry | |
| 2017/0354887 A1 | 12/2017 | Bollermann et al. | |
| 2019/0199966 A1* | 6/2019 | Choi ...................... | H04N 7/152 |
| 2019/0227936 A1* | 7/2019 | Jang ........................ | G06F 9/545 |
| 2020/0342258 A1 | 10/2020 | Uno et al. | |

FOREIGN PATENT DOCUMENTS

| | | |
|---|---|---|
| CN | 106878736 A | 6/2017 |
| CN | 107241598 A | 10/2017 |
| CN | 108833915 A | 11/2018 |
| CN | 108881918 A | 11/2018 |
| CN | 109005455 A | 12/2018 |
| CN | 110381322 A | 10/2019 |
| JP | 2001189906 A | 7/2001 |
| JP | 2007158410 A | 6/2007 |
| JP | 2007221323 A | 8/2007 |
| JP | 2012142905 A | 7/2012 |
| JP | 2013247455 A | 12/2013 |
| JP | 2018011258 A | 1/2018 |
| WO | 2015025705 A1 | 2/2015 |

OTHER PUBLICATIONS

The World Intellectual Property Organization (WIPO) International Search Report for PCT/CN2020/096511 Sep. 2, 2020 5 Pages (including translation).

The Japan Patent Office (JPO) Notification of Reasons for Refusal for Application No. 2021-545768 and Translation Aug. 5, 2022 6 Pages.

Hitoshi Nakazawa, "Smart Sensing of a City, Realization of a smart city on the basis of information reflow, Instrument and Control", Nov. 10, 2013, vol. 52 No. 11, pp. 953 to 959, the Society of Instrument and Control Engineers.

China National Intellectual Property Administration (CHIPA) Office Action 1 for 201910636848.6 Aug. 19, 2022 10 Pages (including translation).

\* cited by examiner

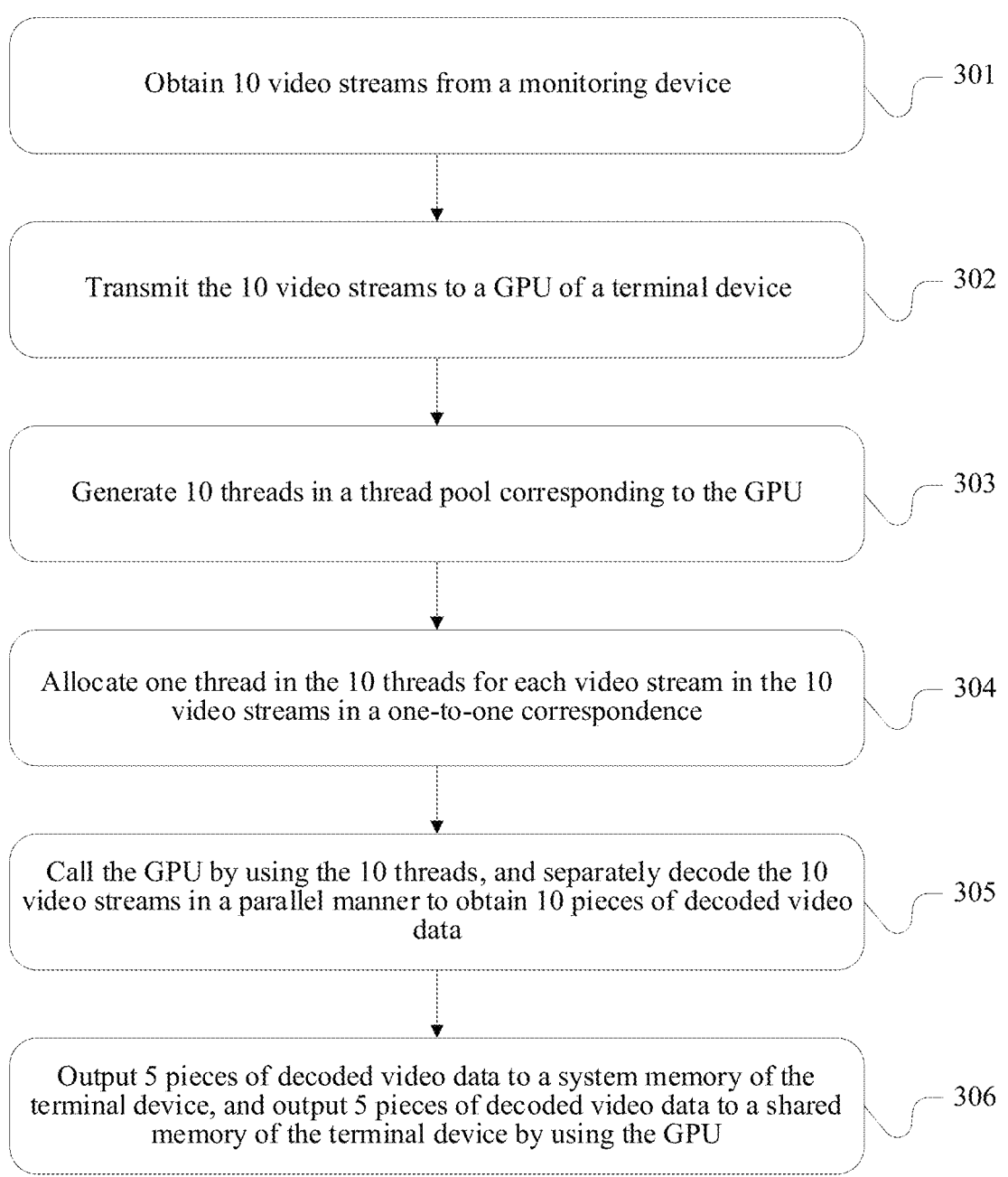

Obtain 10 video streams from a monitoring device — 301

Transmit the 10 video streams to a GPU of a terminal device — 302

Generate 10 threads in a thread pool corresponding to the GPU — 303

Allocate one thread in the 10 threads for each video stream in the 10 video streams in a one-to-one correspondence — 304

Call the GPU by using the 10 threads, and separately decode the 10 video streams in a parallel manner to obtain 10 pieces of decoded video data — 305

Output 5 pieces of decoded video data to a system memory of the terminal device, and output 5 pieces of decoded video data to a shared memory of the terminal device by using the GPU — 306

FIG. 3

VIDEO STREAM DECODING METHOD AND APPARATUS, TERMINAL DEVICE, AND STORAGE MEDIUM

RELATED APPLICATIONS

This application is a continuation of U.S. application Ser. No. 17/500,884 filed on Oct. 13, 2021; U.S. application Ser. No. 17/500,884 is a continuation application of PCT Application No. PCT/CN2020/096511, entitled "VIDEO STREAM DECODING METHOD AND APPARATUS, TERMINAL DEVICE AND STORAGE MEDIUM" and filed on Jun. 17, 2020, which claims priority to Chinese Patent Application No. 201910636848.6, entitled "VIDEO STREAM DECODING METHOD AND APPARATUS, TERMINAL DEVICE, AND STORAGE MEDIUM" filed with the National Intellectual Property Administration, PRC, on Jul. 15, 2019. The three applications are all incorporated by reference in their entirety.

FIELD OF THE TECHNOLOGY

This application relates to the field of computer technologies, and in particular, to a video stream decoding method and apparatus, a terminal device, and a storage medium.

BACKGROUND OF THE DISCLOSURE

With the rapid development of the internet and mobile internet, the total amount of data generated by people (or devices) has grown tremendously. As the amount of data grows constantly, requirements for data processing capabilities have become higher, especially in the field of video processing. With the rapid development of the internet and smart cities, more and more video data need to be stored, transmitted, and processed, which involves a large amount of video encoding and decoding, or video codec for short.

With increased security management, dense high-definition camera surveillance networks are deployed in many places. However, it is difficult to efficiently process the massive amount of video data. A single 2U server can only process 4 to 8 video streams, and a plurality of video streams can reach 1000 Mbps, occupying a large amount of central processing unit (CPU) resources. A large quantity of servers are required to process a plurality of video streams obtained by dense high-definition cameras.

The existing deployment scheme of video stream decoding requires the use of a terminal device with excellent hardware performance, such as a high-performance CPU. This scheme often leads to high hardware costs and high energy consumption. There is a need for efficient solutions for decoding video streams.

SUMMARY

According to embodiments in this application, a video stream decoding method and apparatus, a terminal device, and a storage medium are provided.

A video stream decoding method is provided. The video stream decoding method is performed by a terminal device. The method includes receiving a plurality of video streams from a monitoring device; generating a plurality of threads in a thread pool corresponding to a graphics processing unit (GPU); and transmitting, according to the plurality of threads, the plurality of video streams to the GPU for video decoding processing to obtain a plurality of pieces of decoded video data.

Another aspect of the present application provides a video stream decoding apparatus. The video stream decoding apparatus includes an obtaining unit, configured to receive a plurality of video streams from a monitoring device; a generating unit, configured to generate a plurality of threads in a thread pool corresponding to a graphics processing unit (GPU); and a decoding unit, configured to transmit, according to the plurality of threads, the plurality of video streams to the GPU for video decoding processing to obtain a plurality of pieces of decoded video data.

A non-transitory computer readable storage medium storing computer-readable instructions is provided, the computer-readable instructions, when executed by one or more processors, causing the one or more processors to perform the steps of the video stream decoding method.

A terminal device is provided, including a memory and a processor, the memory storing computer-readable instructions, the computer-readable instructions, when executed by the processor, causing the processor to perform: receiving a plurality of video streams from a monitoring device; generating a plurality of threads in a thread pool corresponding to a graphics processing unit (GPU); and transmitting, according to the plurality of threads, the plurality of video streams to the GPU for video decoding processing to obtain a plurality of pieces of decoded video data.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in some embodiments consistent with this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

FIG. 3 is a schematic flowchart of another embodiment of a video stream decoding method according to an embodiment of this application.

DESCRIPTION OF EMBODIMENTS

To make the objectives, technical solutions, and advantages of this application clear, the following further describes this application in detail with reference to the accompanying drawings and the embodiments. It should be understood that the specific embodiments described herein are merely used to explain this application but are not intended to limit this application. All other embodiments obtained by a person skilled in the art based on some embodiments consistent with this application without creative efforts shall fall within the protection scope of this application.

In the following descriptions, the specific embodiments of this application are described with reference to steps of operations performed by one or more computers and symbols, unless otherwise defined. Therefore, such steps and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner well understood by a person skilled in the art. The data structures where data is maintained are physical locations of the memory that have particular properties defined by the format of the data. However, while the principle of this application is being described in the foregoing text, it is not meant to be limiting as a person skilled in the art will appreciate that the various steps and operations described hereinafter may be implemented in hardware.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 1:
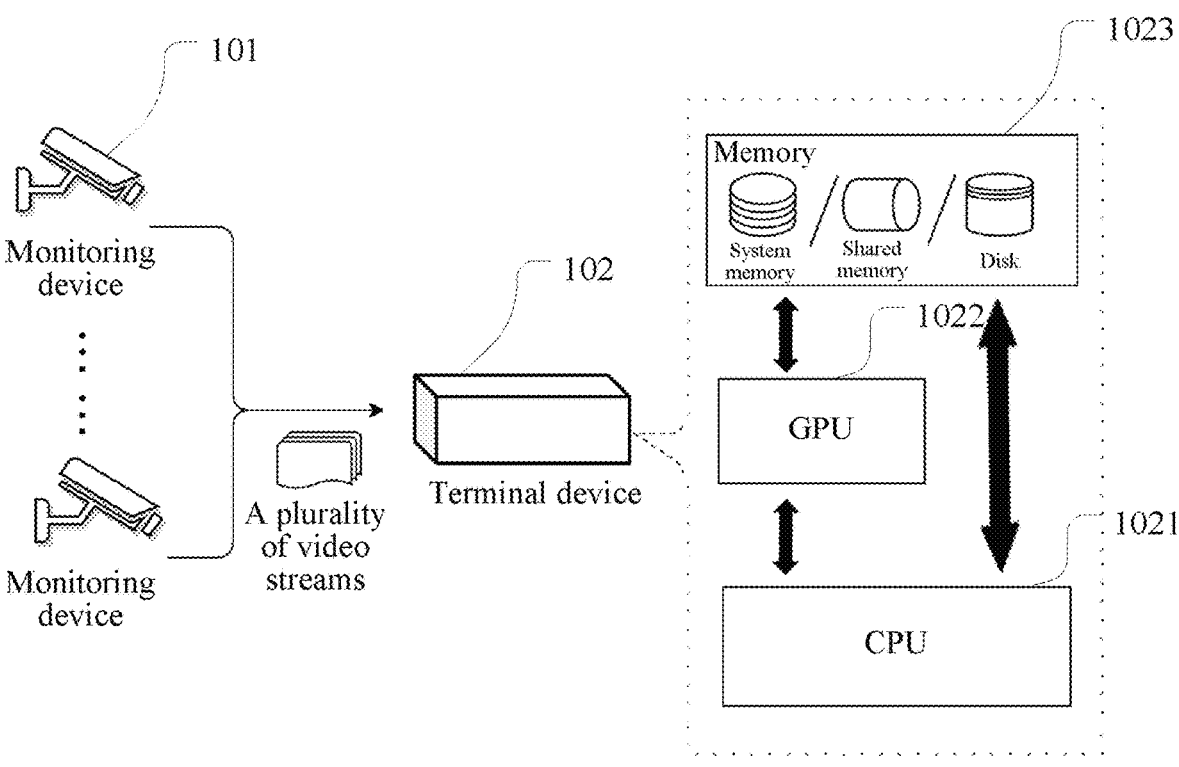
FIG. 1 is a schematic diagram of a scenario of an embodiment of a video stream decoding system according to an embodiment of this application.

FIG. 1 is a schematic diagram of a scenario of a video stream decoding system according to an embodiment of this application. The video stream decoding system may include a terminal device 102 and at least one monitoring device 101. The monitoring device records and encodes a video stream, and transmits the video stream to the terminal device 102 for decoding. Each monitoring device may correspond to one video stream. The monitoring device 101 may be a monitoring camera. The terminal device 102 is integrated with a video stream decoding apparatus, and the terminal device may include a central processing unit (CPU) 1021, a graphics processing unit (GPU) 1022, and a memory 1023. In some embodiments consistent with this application, the terminal device 102 is mainly configured to obtain a plurality of video streams from a monitoring device by using the CPU 1021; generate a plurality of threads in a thread pool corresponding to a GPU; and transmit, according to the plurality of threads, the plurality of video streams to the GPU for video decoding processing to obtain a plurality of pieces of decoded video data.

In some embodiments consistent with this application, the terminal device 102 may be a server. The server may be an independent server, or a server network or server cluster including a plurality of servers. For example, the server described in some embodiments consistent with this application includes, but is not limited to, a computer, a network host, a single network server, or a cloud server including a plurality of network server sets or a plurality of servers. The cloud server includes a large quantity of computers or network servers based on cloud computing. In some embodiments consistent with this application, the server and the monitoring device can communicate through any communication method, including but not limited to mobile communications based on 3rd generation partnership project (3GPP), long term evolution (LTE), worldwide interoperability for microwave access (WiMAX), or computer network communications based on TCP/IP Protocol suite (TCP/IP), user datagram Protocol (UDP), etc.

It is understandable for a person skilled in the art that the application environment shown in FIG. 1 is merely an embodiment of the solutions of this application, and does not construct a limitation to the solutions of this application. Other embodiments may include more terminal devices or monitoring devices than those shown in FIG. 1. For example, only one server and two monitoring devices are shown in FIG. 1. It is understandable that the video stream decoding system may further include one or more other servers, or/and one or more monitoring devices connected to the server network, which is not specifically limited herein.

In addition, as shown in FIG. 1, the memory in the terminal device 102 in the video stream decoding system is configured to store data, such as decoded video data, or surveillance video data, for subsequent viewing when needed. The memory may include at least one of a system memory, a shared memory, or a disk.

The system memory is a synonym for a random-access memory (RAM). The RAM is a main region where a system temporarily stores program instructions and data. Each location in the RAM is identified by a number called a memory address. After the terminal device system is turned off, all data stored in the RAM is lost. The system memory includes a physical memory and a virtual memory. If the physical memory is insufficient when running, the system establishes a virtual memory. The virtual memory is generally 1.5 to 3 times the physical memory.

The disk refers to a memory that uses a magnetic recording technology to store data. As the main storage medium of the computer, a disk can store a large amount of binary data, and can keep the data from being lost even after a power failure. Disks used by computers in early days are soft disks, and commonly used disks nowadays are hard disks. The disk in some embodiments consistent with this application may be a soft disk or/and a hard disk.

The shared memory refers to large-capacity memory that can be accessed by different CPUs in a terminal device. Since the CPUs need to access the disk quickly, it is necessary to cache the disk. After any piece of cached data is updated, as other processors may also need to access the memory, the shared memory needs to be updated immediately; otherwise, different processors may use different data.

The schematic diagram of a scenario of the video stream decoding system shown in FIG. 1 is merely an example. The video stream decoding system and the scenario described in some embodiments consistent with this application are intended to clearly describe the technical solutions in some embodiments consistent with this application, and do not constitute a limitation on the technical solutions provided in some embodiments consistent with this application. A person of ordinary skill in the art knows that, with evolution of the video stream decoding system and appearance of a new service scenario, the technical solutions provided in some embodiments consistent with this application are also applicable to a similar technical problem.

Detailed descriptions are provided below with reference to specific embodiments.

In this embodiment, the description is made from the perspective of a video stream decoding apparatus. The video stream decoding apparatus can be specifically integrated in a terminal device. The terminal device includes a CPU and a GPU. The video stream decoding method in some embodiments consistent with this application is performed by the CPU.

This application provides a video stream decoding method, the method including: receiving a plurality of video streams from a monitoring device; generating a plurality of threads in a thread pool corresponding to a GPU; and transmitting, according to the plurality of threads, the plurality of video streams to the GPU for video decoding processing to obtain a plurality of pieces of decoded video data.

Figure 2:
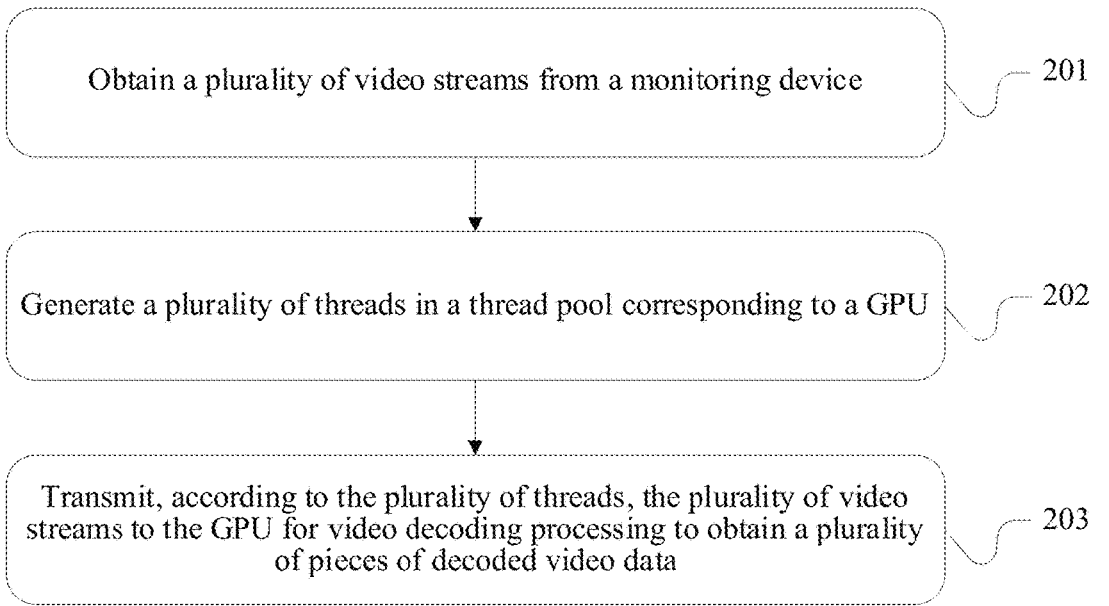
FIG. 2 is a schematic flowchart of an embodiment of a video stream decoding method according to an embodiment of this application.

FIG. 2 is a schematic flowchart of an embodiment of a video stream decoding method according to an embodiment of this application. The video stream decoding method includes:

201: Obtain a plurality of video streams from a monitoring device.

In some embodiments consistent with this application, the monitoring device may refer to the monitoring device 101 shown in FIG. 1, and the monitoring device may monitor and capture video images. Specifically, the monitoring device may be a monitoring camera. There may be one or more monitoring devices. Each monitoring device correspondingly transmits a video stream. The monitoring device can directly transmit a captured video to the terminal device in the form of a video file, i.e., a video stream. For example, the terminal device may establish a connection with the monitoring device by using wired or wireless methods to receive the video stream captured by the monitoring device. The terminal device can obtain the video stream from the monitoring device through the Rtsp Protocol, the GB/T28181 Protocol, or the third-party software development kit (SDK).

In addition, video images captured by the monitoring device can be packaged into different formats to form a video stream and transmitted to the terminal device, for example, a multimedia container (MKV) format or a flash video (FLV) format. Other video formats may also be used, such as an mp4 format, a rmvb format, which are not specifically limited herein.

The obtaining video stream data inputted by a monitoring device may include: obtaining original video streams inputted by the monitoring device, and resolving the original video streams to obtain the video stream data inputted by the monitoring device. In this case, the video stream data inputted by the monitoring device is stored in the form of packets. Similarly, as mentioned later, the decoded video stream data may be stored in a decoded data form. Generally, the decoded video streams are stored in the form of image frames.

202: Generate a plurality of threads in a thread pool corresponding to a GPU.

The GPU, also known as a display core, is a specialized microprocessor designed to perform image operations on personal computers, workstations, game consoles, and some mobile devices. The GPU can be used to convert and drive display information required by a computer system, and provide a scanning signal to a display to control correct displaying of the display. In some embodiments consistent with this application, the terminal device includes a GPU. Since the floating-point arithmetic capability of the GPU is much stronger than that of the CPU, and the current monitoring device generally has low configuration and low CPU processing capability, in some embodiments consistent with this application, video streams are transmitted to the GPU, and the GPU handles the decoding of the video streams, which can greatly reduce the load on the CPU and improve the efficiency of video coding and decoding.

In some embodiments consistent with this application, a plurality of GPUs may be set in the terminal device, and the specific quantity of GPUs is not limited herein. In this case, the transmitting the video streams to the GPU may be: randomly allocating the video streams to the plurality of GPUs. For example, if there are 10 video streams inputted by the monitoring device and two GPUs in the terminal device, three of the 10 video streams may be randomly allocated to one GPU, and the other 7 video streams may be allocated to the other GPU. Certainly, the transmitting the video streams to the GPU may alternatively be: evenly allocating the video streams to the plurality of GPUs. For example, if there are 10 video streams inputted by the monitoring device and two GPUs in the terminal device, 5 video streams may be allocated to each GPU respectively.

In some other embodiments of this application, if the terminal device includes a plurality of GPUs, a corresponding dynamic load balancing rule may further be set in advance. At this time, the transmitting the video streams to the GPU may alternatively be as follows: the terminal device allocates the video streams inputted by the monitoring device to the plurality of GPUs according to a preset dynamic load balancing rule after the plurality of video streams are received. The dynamic load balancing rule may be used to ensure that each GPU in the plurality of GPUs is used in a balanced manner.

In the dynamic load balancing rule, the quantity of video streams allocated to each GPU during the first allocation can be set. For example, during the first allocation, 20 video streams can be allocated to each GPU. For different video streams, it takes different periods of time for the GPUs to complete encoding and decoding. For the subsequent allocation of video streams, the dynamic load balancing rule can be used for dynamic allocation according to the processing condition of each GPU. For example, three GPUs are installed in the terminal device: GPU 1, GPU 2, and GPU 3. During the first allocation, 20 video streams are allocated to each GPU, and GPU 1 may be the first to process the allocated 20 video streams. At this time, according to the dynamic load balancing rule, another 20 video streams can be allocated to GPU 1.

When hardware resources are called, the concept of mutex is introduced to ensure the integrity of shared data operations. Each hardware object corresponds to a tag that can be referred to as a "mutex", and the tag is used to ensure that only one thread can access the hardware object at any time point. Therefore, in view of the foregoing situation where the terminal device is provided with a plurality of GPUs, when video streams are allocated to the GPUs, to avoid mutual influence between the GPUs, a corresponding mutex may be provided for each GPU. The mutex is used to ensure that a plurality of video streams are allocated to only one GPU at one time point. Considering that the thread pool corresponding to a GPU may contain a plurality of threads, to avoid mutual influence between the threads, a corresponding mutex may be provided for each thread. The mutex is used to ensure that only one thread calls the GPU at one time.

When the terminal device is provided with a plurality of GPUs, for each GPU, a plurality of threads can be provided in the thread pool corresponding to the GPU according to thread quantity information inputted by the user. The received plurality of video streams are resolved, and the plurality of threads are used to call the GPU to encode and decode the plurality of resolved video streams. Therefore, one thread can implement encoding and decoding of one resolved video stream by calling a GPU. A plurality of threads can be configured corresponding to one GPU, that is, the plurality of threads can simultaneously call the GPU to process resolved video streams. In this case, one GPU can perform parallel processing of a plurality of video streams, which effectively improves the work efficiency of video encoding and decoding.

In some embodiments consistent with this application, the terminal device includes at least one GPU, each GPU corresponds to a thread pool, and each thread pool may be provided with at least one thread. The quantity of threads provided in a thread pool is the quantity of video streams that can be processed simultaneously correspondingly.

A thread can be understood as interface information for calling a GPU to implement encoding and decoding, and by using the thread, the GPU can be called to implement the encoding and decoding of a video stream. The thread pool can be used to store threads, and the quantity of threads stored in a thread pool can be set according to a user requirement. The quantity of threads contained in the thread pool can be inputted to the terminal device by the user through a relevant interface. At this time, the generating a plurality of threads in a thread pool corresponding to a GPU may specifically include: obtaining thread quantity information inputted by the user; and generating the plurality of threads in the thread pool corresponding to the GPU according to the thread quantity information, where a specific value of the thread quantity can be determined based on the processing capacity of the GPU. For example, if the operation capacity of a GPU is that the GPU can process 10 video streams simultaneously, the user can set the quantity of threads in the thread pool to 10. If the thread quantity set by the user exceeds 10, such as 20, the operation can be prohibited. The quantity of threads contained in the thread pool corresponding to each GPU may be the same or different, which is not limited herein.

In addition, in the step of generating a plurality of threads in a thread pool corresponding to a GPU, the plurality of threads includes threads created in thread pools corresponding to all GPUs in the terminal device. For example, when the terminal device includes a first GPU and a second GPU, the generating a plurality of threads in a thread pool corresponding to a GPU may include: generating a first thread in a thread pool corresponding to the first GPU, and generating a second thread in a thread pool corresponding to the second GPU, the plurality of threads including the first thread and the second thread. The first thread may include at least one thread, and/or the second thread may include at least one thread.

For example, the terminal device includes 2 GPUs: GPU 1 and GPU 2, 5 threads are generated in the thread pool corresponding to GPU 1, and 10 threads are generated in the thread pool corresponding to GPU 2. In the thread pools corresponding to the GPUs of the terminal device, the plurality of threads generated may include 15 threads.

When the terminal device includes a plurality of GPUs and a plurality of threads are generated in thread pools corresponding to the GPUs, GPUs in which the plurality of threads are generated can be set according to requirements of each embodiment. For example, one or more GPUs can be arranged to handle the decoding of video streams inputted by the monitoring device, and other one or more GPUs can be arranged to handle the processing of other images.

In another embodiment of this application, the quantity of to-be-generated threads can be determined according to a video stream quantity of video streams inputted by the monitoring device. Specifically, the generating a plurality of threads in a thread pool corresponding to a GPU may include: obtaining a video stream quantity of video streams inputted by the monitoring device; and generating threads, of which a quantity is the same as the video stream quantity, in the thread pool corresponding to the GPU to obtain the plurality of threads. It is understandable that the processing capability of the GPU in the terminal device is ultimately limited. When the quantity of video streams inputted by the monitoring device exceeds the maximum quantity of threads that can be generated in the thread pool corresponding to the GPU in the terminal device (when the terminal device includes a plurality of GPUs, the maximum quantity is a sum of maximum quantities of threads that can be generated in the plurality of GPUs), the plurality of threads may be the maximum quantity of threads that can be generated in the thread pool corresponding to the GPU in the terminal device, that is, the terminal device can only receive video streams of which the quantity is not greater than the maximum quantity.

203: Transmit, according to the plurality of threads, the plurality of video streams to the GPU for video decoding processing to obtain a plurality of pieces of decoded video data.

In some embodiments of this application, the transmitting, according to the plurality of threads, the plurality of video streams to the GPU for video decoding processing to obtain a plurality of pieces of decoded video data may specifically include: allocating one thread in the plurality of threads for each video stream in the plurality of video streams in a one-to-one correspondence; taking a thread among the plurality of threads as a target thread, and inputting a target video stream into the GPU by using the target thread, the target video stream being a video stream corresponding to the target thread among the plurality of video streams. In this case, the outputting the plurality of pieces of decoded video data to the memories by using the GPU includes: decoding the target video stream by using the GPU to obtain target decoded video data.

When there is a plurality of GPUs in the terminal device, a GPU is called by using a target thread, where the GPU is a GPU corresponding to the target thread. That is, the target thread is a thread in the thread pool corresponding to the GPU.

When a GPU is called by a thread to encode and decode video streams, taking multi-threading as an example, each thread corresponds to a video stream inputted by the monitoring device. In specific implementation, when threads call GPUs to decode video streams, to improve the efficiency of decoding, the threads resolve the video streams. The resolved video streams are equivalent to being divided into smaller constituent units, for example, in the form of packets. That is, one video stream may include at least one packet. When a GPU decodes a plurality of video streams, each video stream is divided into at least one packet. To facilitate the management of packets corresponding to each video stream, corresponding buffers can be set for each thread. Specifically, a first buffer and a second buffer corresponding to each thread can be set on a GPU; the first buffer can be used for storing to-be-decoded video stream data; and the second buffer can be used for storing decoded video stream data.

In some scenes, continuous long-term image frames with no target may exist in a general video stream captured by the monitoring device, such as a scene with no one at night. Video images in such a scene are meaningless images. A large amount of decoding puts a heavy load on the terminal device, and storage after the decoding also occupies a large amount of storage space. Therefore, in some embodiments consistent with this application, it is determined, for each frame of image in a video stream, whether frame skipping is needed, so as to improve decoding efficiency.

Specifically, the step of calling a GPU by using a target thread, to decode the target video stream to obtain target decoded video data may include: sequentially using each frame of image in the target video stream as a target image, and determining whether frame skipping needs to be performed on the target image after the target image is decoded; if yes, discarding the target image.

The determining whether frame skipping needs to be performed on the target image may include: checking whether the target image includes a preset type of object; and determining to frame-skip the target image when the target image does not include the preset type of object. The preset type of object may be set according to a requirement of a specific scene. For example, for a monitoring device, the preset type of object in images in a video captured by the monitoring device may be determined according to an object that the monitoring device needs to monitor, which can be a person or a vehicle. For example, if the monitoring device is used for monitoring the flow of people, the preset type of object may be people. If the monitoring device is used for monitoring a vehicle, the preset type of object may be a vehicle. Certainly, the above are only examples. In practical applications, the preset type of object may include one or more types of objects. In addition to the objects such as people and vehicle, moving objects such as an animal and airplane may also be included. In addition, monitoring an object (such as a vehicle or a person) in a target image is a common technology in the art. For details, reference may be made to the related art, which is not repeated herein.

In some embodiments consistent with this application, polling can be performed on each video stream inputted by the monitoring device. When it is found that the decoding of a video stream is finished, it can be detected whether the video stream needs to be replayed, to determine whether the decoding of the video stream is abnormal. An abnormal video stream may be replayed and decoded again. Specifically, the video stream decoding method in some embodiments consistent with this application further includes: determining whether the target video stream needs to be replayed when decoding of the target video stream is finished; if yes, restarting the target thread, reusing the target thread to call the GPU to decode the target video stream to obtain target decoded video data; and if no, collecting the target thread. Since thread resources in the thread pool corresponding to the GPU in the terminal device system are limited, the quantity of threads that can run at the same time is limited. By default, after a thread is finished, corresponding GPU resources are not released. Therefore, if a thread is repeatedly generated in a program, and the thread exits by default, thread resources are eventually used up and no new threads can be generated in the thread pool corresponding to the GPU. Therefore, by collecting threads reasonably, the capability of the terminal device can be restored to decode video streams in time, which can improve the efficiency of decoding.

At present, there are many methods to encode a video stream, and each encoding method has a corresponding decoding method. When a video stream is decoded, the method by which the video stream is encoded, and factors such as a resolution, a color, and the size of the video stream need to be obtained. The GPU cannot automatically identify such parameter information. Therefore, in some embodiments consistent with this application, before the thread calls the GPU for decoding processing, the parameter information (decoding parameter information corresponding to encoding parameter information), that is, a decoding rule, needs to be obtained. The parameter information may include: a decoding format, a resolution, a color, and a size. The main function of the encoding and decoding is to compress and decompress a video stream, and a decoding format can be used to indicate the method by which the video stream is decompressed. The parameter information is sorted according to a format requirement to obtain the decoding rule, which can be used to express a requirement for decoding a video stream.

In some embodiments consistent with this application, according to the pre-obtained decoding rule, a relevant architecture of a video decoding library, such as a compute unified device (CUDA or CUVID) architecture, can be set. Thus, the GPU can implement decoding of video stream packets inputted by the monitoring device. In a specific implementation, when the video stream packets inputted by the monitoring device are decoded, three callback functions are involved, which are a format change callback function, a decode callback function, and a display callback function. The format change callback function is mainly used for being called when a format of a video stream changes. In some network emergencies, the format of the video stream may change. In this case, the format change callback function can be called to change the format of a changed video stream to an original format. The decoding callback function can be used for decoding a packet, the decoded packet may exist in the form of a frame, and the display callback function can be used for displaying or storing the frame.

In some embodiments consistent with this application, if the GPU supports decoding of a video stream inputted by the monitoring device, the GPU can decode the video stream inputted by the monitoring device by using a CUDA-based CUVID video decoding library. The decoding architecture the GPU used is not limited in some embodiments consistent with this application.

In one embodiment, a format of a video stream inputted by the monitoring device may be an H.264 format, and after the GPU decodes the video stream inputted by the monitoring device, a format of obtained decoded video data may be an NV12 format. In some embodiments consistent with this application, the process of decoding the video stream inputted by the monitoring device by using the GPU to obtain the decoded video data may further include a format conversion process. For example, the decoding the video stream inputted by the monitoring device by using the GPU to obtain the decoded video data may include: decoding the video stream inputted by the monitoring device by using the GPU to obtain first decoded video data, and performing format conversion processing on the first decoded video data to obtain second decoded video data. For example, a format of the video stream inputted by the monitoring device is the H.264 format, and the first decoded video data is the NV12 format. Format conversion processing is performed on the format of the first decoded video data, that is, a format conversion is performed on the first decoded video data in the NV12 format to obtain the second decoded video data in an RGB24 format. For example, the GPU can perform a format conversion on the first decoded video data by using the CUDA architecture, and the format conversion method used by the GPU is not limited in some embodiments consistent with this application. If there are a plurality of video streams inputted by the monitoring device, and the GPU decodes the plurality of different video streams, format conversion processes can be different. For example, the video streams can be converted to different formats. In this case, output video image frames of a plurality of formats and different color spaces are stored to a system memory, a shared memory, a disk file and other memories.

In one embodiment, after the GPU performs format conversion processing on the second decoded video data, the GPU may further perform scaling processing on the second decoded video data to obtain decoded data of a suitable size. At this time, the decoding the video stream inputted by the monitoring device by using the GPU to obtain the decoded video data may also include: scaling the second decoded video data to obtain third decoded video data. If there are a plurality of video streams being inputted by the monitoring device, and the GPU decodes the plurality of different video streams, parameters corresponding to the scaling processing can be different. In this case, output video image frames of a plurality of sizes are stored to a system memory, a shared memory, a disk file and other memories.

In one embodiment, a frame rate controller is further provided in the video stream decoding apparatus in some embodiments consistent with this application. The frame rate controller can receive decoding frame rate information set by the user, and control, according to the decoding frame rate information, a rate at which the GPU decodes the video stream, for example, 20 fps. It is understandable that if there are a plurality of video streams inputted by the monitoring device, decoding frame rate information corresponding to each video stream can be set separately. For example, a decoding frame rate of a first video stream is 20 fps, and a decoding frame rate of a second video stream is 30 fps, which is not specifically limited herein.

Specifically, after the GPU receives the plurality of video streams inputted by the monitoring device, the GPU may decode the plurality of video streams in a parallel manner to obtain decoded video data. Since the GPU generally does not support the decoding of video streams of all formats, in some embodiments consistent with this application, whether the GPU supports the decoding of the current video stream can be determined.

Specifically, in one embodiment, the CPU can obtain performance parameters of the GPU, and determine whether the GPU supports hard decoding of a currently received video stream (that is, a video stream inputted by the monitoring device) according to the performance parameters of the GPU and a format of the currently received video stream. For example, if the format of the video stream inputted by the monitoring device is the H.264 format, and the video stream decoding apparatus can obtain the performance parameters of the GPU, and determine that the GPU can support hard decoding of the video stream in this format according to the performance parameters of the GPU, it is determined that the GPU supports the hard decoding of this format. The video stream inputted by the monitoring device can be decoded later to obtain decoded video data.

In some embodiments consistent with this application, the CPU in the terminal device is a large-scale integrated circuit, and is the computing core and control unit of a computer. The main functions of the CPU are to interpret computer instructions and process data in computer software. The CPU mainly includes an arithmetic logic unit (ALU), a cache, and a bus realizing the collection of data, control, and status between the ALU and the cache. The CPU, the memory, and the input/output (I/O) devices are collectively referred to as the three core components of electronic computers.

In some implementations, video decoding can be done by a CPU alone. However, due to the limited encoding and decoding capabilities of the CPU, it is difficult for the CPU to decode video streams. Therefore, in some embodiments consistent with this application, it is preferable to decode video streams inputted by the monitoring device by using a GPU, to obtain decoded video data.

In one embodiment, if the video stream decoding apparatus determines that the GPU does not support hard decoding processing of video streams inputted by the monitoring device, the CPU in the terminal device can decode the video streams inputted by the monitoring device, and transmit decoded video data obtained after the decoding processing to the GPU. For example, the CPU can use a fast forward mpeg (FFMPGE) to decode video streams inputted by the monitoring device. FFMPGE is an open-source computer program that can be used to record and convert a digital audio or video, and convert the audio or video into a stream. In this way, for a video format supported by the GPU for decoding, the GPU is preferentially used for decoding. For a video format not supported by the GPU, the CPU is used for decoding. In this case, the utilization rate and decoding efficiency of the GPU are greatly improved, CPU resources are saved, and the efficiency of the CPU in processing other services is improved.

In some embodiments consistent with this application, the memories of the terminal device may include one or more different types of memories. Specifically, the memories of the terminal device may include a plurality of memories, such as a system memory, a shared memory, and a disk file in the terminal device. Thus, the video stream decoding method further includes: identifying respective memories corresponding to the plurality of pieces of decoded video data; and outputting the plurality of pieces of decoded video data to the memories by using the GPU.

In some embodiments consistent with this application, the plurality of pieces of decoded video data may include first decoded video data and second decoded video data. In this case, the identifying respective memories corresponding to the plurality of pieces of decoded video data includes: identifying a first memory corresponding to the first decoded video data; and identifying a second memory corresponding to the second decoded video data; and the step of the outputting the plurality of pieces of decoded video data to the memories by using the GPU may include: outputting the first decoded video data to the first memory and outputting the second decoded video data to the second memory by using the GPU, the first memory and the second memory being different memories in the terminal device. Accordingly, a plurality of video streams can be decoded and outputted to different memories by the GPU, which can better support an embodiment where image frame data corresponding to video streams needs to be outputted to a storage medium other than the GPU, such as a system memory, a shared memory, and a disk.

The first decoded video data may include decoded video data corresponding to at least one video stream. The second decoded video data may also include decoded video data corresponding to at least one video stream. In some embodiments of this application, the plurality of pieces of decoded video data includes first decoded video data and second decoded video data. That is, the plurality of video streams is divided into a first video stream and a second video stream, and the plurality of pieces of decoded video data are divided into the first decoded video data and the second decoded video data. For example, the plurality of video streams includes 10 video streams, where the first video stream includes 5 video streams, and the second video stream includes 5 video streams. The first decoded video data of the 5 video streams in the first video stream can be outputted to the first memory, and the second decoded video data of the 5 video streams in the second video stream can be outputted to the second memory.

In some other embodiments of this application, the first decoded video data and the second decoded video data may be part of the plurality of pieces of decoded video data. For example, the plurality of video streams includes 10 video streams, where the first video stream includes 5 video streams, and the second video stream includes 2 video streams, and there are other video streams in addition to the first video stream and the second video stream in the plurality of video streams. In a specific embodiment, the plurality of video streams further includes a third video stream, that is, the plurality of pieces of decoded video data further includes third decoded video data. In this case, the identifying respective memories corresponding to the plurality of pieces of decoded video data further includes: identifying a third memory corresponding to the third decoded video data; and in this case, the outputting the decoded video data to the memories by using the GPU includes: outputting the third decoded video data to the third memory by using the GPU.

One of the most important functional units of a computer is a memory, which is a collection of many memories. To make the CPU accurately find a memory that stores a piece of information, different "ID card numbers", namely, address codes need to be allocated to the units. Various types of memories are integrated in an embedded processor. Usually, memories of the same type are called a memory block. Under normal circumstances, the processor designer allocates a set of natural numbers to each memory block as an address code of each memory block, where the set of natural numbers are hexadecimal numbers with continuous numerical values, and a quantity of the natural numbers in the set is equal to the quantity of memories. The corresponding relationship between the set of natural numbers and the memory block is a memory map, sometimes referred to as an address map. In fact, the term "address map" is more appropriate. The memory map is a preparatory action when a computer system (power on) resets, and is an automatic process that allocates address code resources owned by the processor to each physical memory block in the system.

In some embodiments consistent with this application, the GPU may be used to output decoded video data to memories through a GPU COPY technology and the memory map. Specifically, the work of memory map in the related art is handed over to an execution unit (EU) of the GPU. The EU is the execution unit in the GPU, and is responsible for the execution of instructions. In fact, the EU has both the function of a controller and the function of an arithmetic unit.

In a specific implementation, the outputting the plurality of pieces of decoded video data to the memories by using the GPU includes: obtaining address codes of the memories corresponding to the plurality of pieces of decoded video data by using the GPU; performing, by using the GPU, a memory map according to the address codes of the memories to determine target memories corresponding to the plurality of pieces of decoded video data, and outputting the plurality of pieces of decoded video data to the target memories by using the GPU.

In some embodiments consistent with this application, a plurality of video streams from a monitoring device are obtained; a plurality of threads are generated in a thread pool corresponding to a GPU; and according to the plurality of threads, the plurality of video streams are transmitted to the GPU for video decoding processing to obtain a plurality of pieces of decoded video data. In some embodiments consistent with this application, the plurality of threads are generated in the thread pool corresponding to the GPU, so that the GPU is used to replace the CPU to complete parallel decoding of a plurality of pieces of video stream data, which greatly reduces the energy consumption of the entire device, improves the video decoding efficiency and the device utilization rate of the GPU, and reduces the dependence on the CPU. The method in some embodiments consistent with this application is widely applicable to video stream decoding scenarios where the CPU processing capability of a terminal device is not strong.

As shown in FIG. 3, the following describes the video stream decoding method in some embodiments consistent with this application with reference to a specific embodiment.

301: Obtain 10 video streams from a monitoring device.

In this embodiment, a terminal device includes a CPU, a GPU, and memories. The memories include a shared memory and a system memory. There can be 10 monitoring devices connected to the terminal device, and each monitoring device transmits a video stream corresponding to a surveillance video.

302: Transmit the 10 video streams to a GPU of a terminal device.

In this embodiment, the terminal device including only one GPU is used as an example. 20 threads can be provided in a thread pool corresponding to the GPU, which means that the GPU supports processing of up to 20 video streams. In this case, since the GPU processing capacity is greater than the quantity of video streams, the 10 video streams can be directly transmitted to the GPU of the terminal device.

303: generated 10 threads in a thread pool corresponding to the GPU.

In this embodiment, in the thread pool corresponding to the GPU, the step of generating 10 threads may be: obtaining thread quantity information (10) inputted by the user; and generating the 10 threads in the thread pool corresponding to the GPU according to the thread quantity information (10). Alternatively, in the thread pool corresponding to the GPU, the step of generating 10 threads may be: obtaining a video stream quantity (10) of video streams inputted by 10 surveillance videos; and generating threads, of which a quantity is the same as the video stream quantity, in the thread pool corresponding to the GPU to obtain the 10 threads.

304: Allocate one thread in the 10 threads for each video stream in the 10 video streams in a one-to-one correspondence.

305: Call the GPU by using the 10 threads, and separately decode the 10 video streams in a parallel manner to obtain 10 pieces of decoded video data.

A frame rate controller is provided in the terminal device. The frame rate controller can receive decoding frame rate information set by the user, and control, according to the decoding frame rate information, a rate at which the GPU decodes each video stream, for example, 20 fps. Certainly, decoding frame rates of the 10 video streams can be set separately. For example, a decoding frame rate of the first video stream is 20 fps, and a decoding frame rate of the second video stream is 30 fps.

306. Output 5 pieces of decoded video data to a system memory of the terminal device, and output 5 pieces of decoded video data to a shared memory of the terminal device by using the GPU.

In this embodiment, it is assumed that the memories of the terminal device include a system memory and a shared memory. The 10 pieces of video streams are outputted to the system memory and the shared memory respectively, where 5 pieces of decoded video data are outputted to the system memory, and 5 pieces of decoded video data are outputted to the shared memory. Therefore, by using the GPU, the 5 pieces of decoded video data can be directly outputted to the system memory of the terminal device, and the other 5 pieces of decoded video data can be outputted to the shared memory of the terminal device.

In some embodiments consistent with this application, 10 video streams inputted by a monitoring device are obtained; the 10 video streams are transmitted to a GPU of a terminal device; the 10 video streams are decoded by using the GPU of the terminal device to obtain 10 pieces of decoded video data; and the 10 pieces of decoded video data are respectively outputted to a system memory and a shared memory of the terminal device by using the GPU. In some embodiments consistent with this application, the GPU is used to replace the CPU to complete the decoding of video stream data, which greatly reduces the energy consumption of the entire device, improves the video decoding efficiency and the device utilization rate of the GPU. In addition, the decoded data is directly outputted from the GPU to the system memory, which further reduces the dependence on the CPU, and can better support an embodiment where frame data needs to be outputted to a storage medium other than the GPU, making it applicable to more embodiments.

It is to be understood that, although the steps are displayed sequentially according to the instructions of the arrows in the flowcharts of the embodiments, the steps are not necessarily performed sequentially according to the sequence instructed by the arrows. Unless otherwise explicitly specified in this application, execution of the steps is not strictly limited, and the steps may be performed in other sequences. In addition, at least some steps in the flowcharts may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of another step.

To help better implement the video stream decoding method provided in some embodiments consistent with this application, some embodiments consistent with this application further provide an apparatus that is based on the foregoing video stream decoding method. The meanings of nouns are the same as those in the foregoing video stream decoding method. For specific implementation details, refer to the description in the method embodiments.

Figure 4:
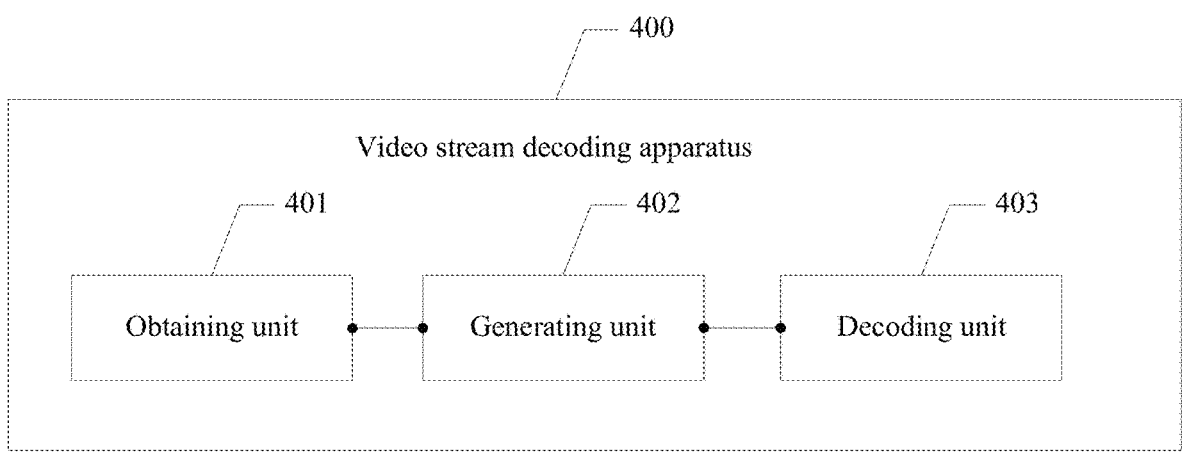
FIG. 4 is a schematic structural diagram of an embodiment of a video stream decoding apparatus according to an embodiment of this application.

FIG. 4 is a schematic structural diagram of a video stream decoding apparatus according to an embodiment of this application. The video stream decoding apparatus is applicable to a terminal device. The terminal device includes a GPU and a memory. The video stream decoding apparatus 400 includes an obtaining unit 401, a generating unit 402, and a decoding unit 403. All or some of the units included in the video stream decoding apparatus may be implemented by software, hardware, or a combination thereof.

The obtaining unit 401 is configured to obtain a plurality of video streams from a monitoring device.

The generating unit 402 is configured to generate a plurality of threads in a thread pool corresponding to a GPU.

The decoding unit 403 is configured to transmit, according to the plurality of threads, the plurality of video streams to the GPU for video decoding processing to obtain a plurality of pieces of decoded video data.

In some embodiments of this application, the generating unit 402 is specifically configured to obtain an inputted thread quantity; and generated the plurality of threads in the thread pool corresponding to the GPU according to the thread quantity, a quantity of the plurality of threads being equal to the thread quantity.

In some embodiments of this application, the generating unit 402 is specifically configured to obtain a video stream quantity of the plurality of video streams by using a CPU; and generated threads, of which a quantity is the same as the video stream quantity, in the thread pool corresponding to the GPU.

In some embodiments of this application, the decoding unit 403 is specifically configured to allocate one thread in the plurality of threads for each video stream in the plurality of video streams in a one-to-one correspondence; take a thread among the plurality of threads as a target thread, and input a target video stream into the GPU by using the target thread, the target video stream being a video stream corresponding to the target thread among the plurality of video streams; and decode the target video stream by using the GPU to obtain target decoded video data.

In some embodiments of this application, the decoding unit 403 is specifically configured to sequentially use each frame of image in the target video stream as a target image, and decode the target image by using the GPU; and determine to frame-skip the target image when the target image does not include a preset type of object.

In some embodiments of this application, the decoding unit 403 is specifically configured to restart the target thread, input the target video stream into the GPU by reusing the target thread, and decode the target video stream by using the GPU to obtain the target decoded video data when decoding of the target video stream ends and the target video stream needs to be replayed.

In some embodiments of this application, the decoding unit 403 is specifically configured to collect the target thread when decoding of the target video stream ends and the target video stream does not need to be replayed.

In some embodiments of this application, the terminal device further includes memories, and the apparatus further includes an output unit, and the output unit is configured to identify respective memories corresponding to the plurality of pieces of decoded video data; and output the plurality of pieces of decoded video data to the memories by using the GPU.

In some embodiments of this application, the plurality of pieces of decoded video data include first decoded video data and second decoded video data, and the output unit is further configured to: identify a first memory corresponding to first decoded video data, identify a second memory corresponding to the second decoded video data; and output the first decoded video data to the first memory and output the second decoded video data to the second memory by using the GPU.

In some embodiments of this application, the plurality of pieces of decoded video data includes first decoded video data and second decoded video data.

In some embodiments of this application, the plurality of pieces of decoded video data further includes third decoded video data, and the output unit is specifically configured to: obtain a third memory corresponding to the third decoded video data; and output the third decoded video data to the third memory by using the GPU.

In some embodiments of this application, the memories include at least one of a system memory, a shared memory, or a disk.

In some embodiments of this application, the output unit is specifically configured to obtain address codes of the memories corresponding to the plurality of pieces of decoded video data by using the GPU; perform, by using the GPU, a memory map according to the address codes to determine target memories corresponding to the plurality of pieces of decoded video data; and output the plurality of pieces of decoded video data to the target memories by using the GPU.

In some embodiments consistent with this application, the obtaining unit 401 is configured to obtain a plurality of video streams from a monitoring device; the generating unit 402 is configured to generate a plurality of threads in a thread pool corresponding to a GPU; and the decoding unit 403 is configured to transmit, according to the plurality of threads, the plurality of video streams to the GPU for video decoding processing to obtain a plurality of pieces of decoded video data. In some embodiments consistent with this application, the plurality of threads are generated in the thread pool corresponding to the GPU, so that the GPU is used to replace the CPU to complete parallel decoding of a plurality of pieces of video stream data, which greatly reduces the energy consumption of the entire device, improves the video decoding efficiency and the device utilization rate of the GPU, and reduces the dependence on the CPU. The apparatus in some embodiments consistent with this application is widely applicable to video stream decoding scenarios where the CPU processing capability of a terminal device is not strong.

During specific implementation, each of the foregoing units may be implemented as an independent entity; or may be combined in different manners, so as to be implemented as a same entity or several entities. For specific implementations of the foregoing units, refer to the foregoing method embodiments.

Figure 5:
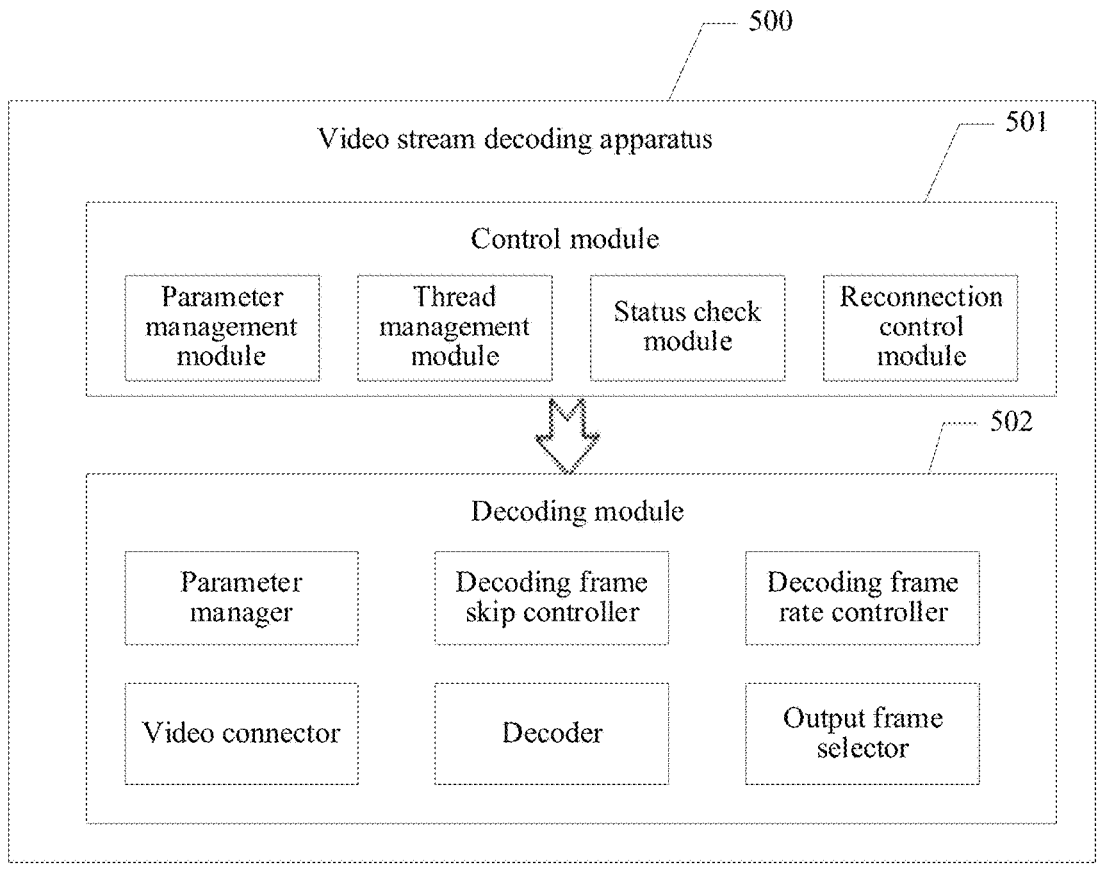
FIG. 5 is a schematic structural diagram of another embodiment of a video stream decoding apparatus according to an embodiment of this application.

FIG. 5 is a schematic structural diagram of another embodiment of a video stream decoding apparatus according to an embodiment of this application. The video stream decoding apparatus 500 includes a control module 501 and a decoding module 502. All or some of the modules included in the video stream decoding apparatus may be implemented by software, hardware, or a combination thereof.

The control module 501 is configured to obtain video streams inputted by a monitoring device; and transmit the video streams to a GPU.

The decoding processing 502 is configured to decode the video streams by using the GPU to obtain decoded video data; and output the decoded video data to memories by using the GPU.

The control module 501 and the decoding module 502 may further include more modules. For example, in FIG. 5, the control module 501 may include a parameter management module, a thread management module, a status check module, and a reconnection control module. The parameter management module is configured to manage decoding rules and decoding-related parameters (such as a color space, and an output frame size). The thread management module is configured to manage threads in a thread pool corresponding to the GPU. The status checking module is configured to check a current decoding status. The reconnection control module is configured to detect whether a target video stream needs to be decoded and replayed, so as to avoid decoding abnormalities. Similarly, the decoding module 502 may further include modules such as a parameter manager, a video connector, a decoding frame skip controller, a decoding frame rate controller, and an output frame selector. The parameter manager is configured to obtain decoding rules and decoding-related parameters in the parameter management module of the control module 501. The video connector is configured to connect to a monitoring device to obtain a plurality of video streams inputted by the monitoring device. The decoding frame skip controller is configured to determine whether frame skipping needs to be performed on the current image frame during a decoding process of a video stream. For example, as described in the foregoing embodiment, whether frame skipping needs to be performed on an image is determined by detecting whether the image contains a preset type of object. The decoding frame rate controller is configured to set a decoding frame rate, and control a decoding rate of a video stream by controlling the decoding frame rate. The output frame selector is configured to sift an output image frame of decoded data. For example, if "car" is set as a sift object in the output frame selector, image frames containing "car" in the decoded data are sifted and outputted.

In the embodiments, there can be only one control module 501, and a plurality of decoding modules 502. The quantity of the decoding modules 502 can be set corresponding to the video stream quantity of the inputted video streams. For example, if 10 video streams are inputted, the decoding modules 502 can set to 10 correspondingly.

In an embodiment of this application, a terminal device is provided, including a processor and a memory, the memory storing computer-readable instructions, the computer-readable instructions, when executed by the processor, causing the processor to perform the steps of the video stream decoding method according to this application.

Specifically, in an embodiment, the processor includes a CPU and a GPU, and the computer-readable instructions include a first computer-readable instruction and a second computer-readable instruction. The first computer-readable instruction, when executed by the CPU, causes the CPU to perform the following steps: receiving a plurality of video streams inputted by a monitoring device; generating a plurality of threads in a thread pool corresponding to a GPU, and transmitting, according to the plurality of threads, the plurality of video streams to the GPU; and the second computer-readable instruction, when executed by the GPU, causes the GPU to perform the following step: decoding the plurality of video streams in a parallel manner to obtain a plurality of pieces of decoded video data.

Figure 6:
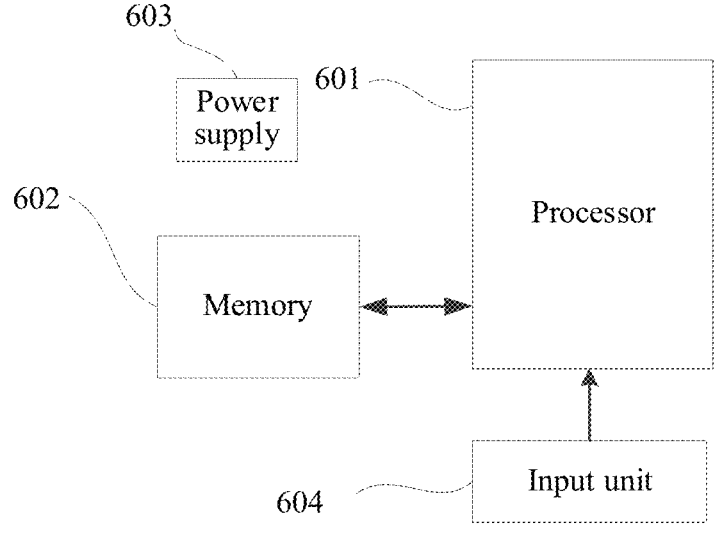
FIG. 6 is a schematic structural diagram of a terminal device according to an embodiment of this application.

FIG. 6 is a schematic structural diagram of a terminal device according to an embodiment of this application. Specifically: the terminal device may include components such as a processor 601 with one or more processing cores, a memory 602 with one or more computer-readable storage media, a power supply 603, and an input unit 604. A person skilled in the art may understand that the structure of the terminal device shown in FIG. 6 is not intended to limit the terminal device, and the terminal device may include more components or fewer components than those shown in the figure, or some components may be combined, or a different component deployment may be used. In the drawings, The processor 601 is the control center of the terminal device, and is connected to various parts of the terminal device by using various interfaces and lines. By running or executing the software program and/or module stored in the memory 602, and calling data stored in the memory 602, the processor 601 performs various functions and data processing of the terminal device, thereby performing overall monitoring on the terminal device. In some embodiments, the processor 601 may include one or more processing cores. In some embodiments, the processor 601 may integrate an application processor and a modem processor. The application processor mainly processes an operating storage medium, a user interface, an application program, and the like. The modem processor mainly processes wireless communication. It may be understood that the foregoing modem processor may alternatively not be integrated into the processor 601.

The memory 602 may be configured to store a software program and a module, and the processor 601 runs the software program and the module that are stored in the memory 602, to implement various functional applications and data processing. The memory 602 may mainly include a program storage area and a data storage area. The program storage area may store an operating storage medium, an application program required by at least one function (for example, a sound playback function and an image display function), and the like. The data storage area may store data generated according to use of the terminal device, and the like. In addition, the memory 602 may include a high speed random access memory, and may further include a non-volatile memory, such as at least one magnetic disk storage device, a flash memory device or other non-volatile solid state storage devices. Correspondingly, the memory 602 may further include a memory controller, so that the processor 601 can access the memory 602.

The terminal device further includes the power supply 603 for supplying power to the components. Preferably, the power supply 603 may be logically connected to the processor 601 by using a power management storage medium, thereby implementing functions such as charging, discharging, and power consumption management by using the power management storage medium. The power supply 603 may further include one or more direct current or alternate current power supplies, one or more re-charging storage mediums, one or more power supply fault detection circuits, one or more power supply converters or inverters, one or more power supply state indicators, or any other components.

The terminal device may further include an input unit 604. The input unit 604 may be configured to receive inputted digit or character information, and generate a keyboard, mouse, joystick, optical or track ball signal input related to the user setting and function control.

Although not shown in the figures, the terminal device may further include a display unit. Specifically, in this embodiment, the processor 601 in the terminal device may load executable files corresponding to processes of one or more application programs to the memory 602 according to the following instructions, and the processor 601 runs the application program stored in the memory 602, to implement various functions as follows: receiving a plurality of video streams inputted by a monitoring device; generating a plurality of threads in a thread pool corresponding to a GPU; and transmitting, according to the plurality of threads, the plurality of video streams to the GPU for video decoding processing to obtain a plurality of pieces of decoded video data.

In an embodiment, a computer-readable storage medium is provided, storing computer-readable instructions, the computer-readable instructions, when executed by the processor, causing the processor to perform the steps in the foregoing video stream decoding method. The steps of the video stream decoding method herein may be the steps of the video stream decoding method in each of the foregoing embodiments.

A person of ordinary skill in the art may understand that all or some procedures in the methods in the foregoing embodiments may be implemented by a computer-readable instruction instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A video stream decoding method comprising:
receiving a plurality of video streams;
generating a plurality of threads in a thread pool corresponding to a graphics processing unit (GPU);
transmitting, according to the plurality of threads, the plurality of video streams to the GPU for video decoding processing to obtain a plurality of pieces of decoded video data, the plurality of pieces of decoded video data comprise a first number of pieces of first decoded video data and a second number of pieces of second decoded video data;
identifying a first memory corresponding to the first number of pieces of first decoded video data, and a second memory corresponding to the second number of pieces of second decoded video data, the first memory and the second memory being located outside of the GPU; and
outputting, by using the GPU, the first number of pieces of first decoded video data to the first memory and outputting the second number of pieces of second decoded video data to the second memory.

2. The video stream decoding method according to claim 1, wherein the generating a plurality of threads in a thread pool corresponding to a GPU comprises:
obtaining an inputted thread quantity; and
generating the threads in the thread pool corresponding to the GPU according to the thread quantity.

3. The video stream decoding method according to claim 1, wherein the generating a plurality of threads in a thread pool corresponding to a GPU comprises:

obtaining a video stream quantity of the plurality of video streams; and generating threads in the thread pool corresponding to the GPU, a quantity of the threads being the same as the video stream quantity.

4. The video stream decoding method according to claim 3, wherein the transmitting, according to the plurality of threads, the plurality of video streams to the GPU for video decoding processing to obtain a plurality of pieces of decoded video data comprises:

allocating one thread in the plurality of threads for each video stream in the plurality of video streams in a one-to-one correspondence;

identifying a thread among the plurality of threads as a target thread, and inputting a target video stream into the GPU by using the target thread, the target video stream being a video stream corresponding to the target thread among the plurality of video streams; and decoding the target video stream by using the GPU to obtain target decoded video data.

5. The video stream decoding method according to claim 4, wherein the decoding the target video stream by using the GPU to obtain target decoded video data comprises:

sequentially using each frame of image in the target video stream as a target image, and decoding the target image by using the GPU; and determining to frame-skip the target image when the target image does not comprise a preset type of object.

6. The video stream decoding method according to claim 4, wherein the method further comprises:

restarting the target thread, inputting the target video stream into the GPU by reusing the target thread when the target video stream needs to be replayed, and decoding the target video stream by using the GPU to obtain the target decoded video data.

7. The video stream decoding method according to claim 4, wherein the method further comprises:

collecting the target thread when decoding of the target video stream ends and the target video stream does not need to be replayed.

8. The video stream decoding method according to claim 1, wherein the plurality of pieces of decoded video data further comprises third number of pieces of decoded video data, and the method further comprises:

identifying a third memory corresponding to the third number of pieces of decoded video data, the third memory being external to the GPU; and outputting, by using the GPU, the third number of pieces of decoded video data to the third memory.

9. The video stream decoding method according to claim 1, wherein the first and second memories are identified from memories coupled to the GPU, and the memories coupled to the GPU comprise at least one of a system memory, a shared memory, or a disk.

10. The video stream decoding method according to claim 1, further comprising:

obtaining address codes of memories corresponding to the plurality of pieces of decoded video data;

performing a memory map according to the address codes to determine target memories corresponding to the plurality of pieces of decoded video data; and outputting the plurality of pieces of decoded video data to the respective corresponding target memories.

11. The method according to claim 1, wherein at least one of the first number and the second number is an integer greater than 1.

12. A video stream decoding apparatus, comprising a memory and at least one processor, the memory storing computer-readable instructions, the computer-readable instructions, when executed by the at least one processor, causing the at least one processor to:

receive a plurality of video streams;

generate a plurality of threads in a thread pool corresponding to a graphics processing unit (GPU);

transmit, according to the plurality of threads, the plurality of video streams to the GPU for video decoding processing to obtain a plurality of pieces of decoded video data, the plurality of pieces of decoded video data comprise a first number of pieces of first decoded video data and a second number of pieces of second decoded video data;

identify a first memory corresponding to the first number of pieces of first decoded video data, and a second memory corresponding to the second number of pieces of second decoded video data, the first memory and the second memory being located outside of the GPU; and output, by using the GPU, the first number of pieces of first decoded video data to the first memory and outputting the second number of pieces of second decoded video data to the second memory.

13. The video stream decoding apparatus according to claim 12, wherein the at least one processor is further configured to obtain an inputted thread quantity; and generated the plurality of threads in the thread pool corresponding to the GPU according to the thread quantity, a quantity of the plurality of threads being equal to the thread quantity.

14. The video stream decoding apparatus according to claim 12, wherein the at least one processor is further configured to obtain a video stream quantity of the plurality of video streams; and generate threads in the thread pool corresponding to the GPU, a quantity of the threads being the same as the video stream quantity.

15. The video stream decoding apparatus according to claim 14, wherein the at least one processor is further configured to:

allocate one thread in the plurality of threads for each video stream in the plurality of video streams in a one-to-one correspondence;

take a thread among the plurality of threads as a target thread, and input a target video stream into the GPU by using the target thread, the target video stream being a video stream corresponding to the target thread among the plurality of video streams; and decode the target video stream by using the GPU to obtain target decoded video data.

16. The video stream decoding apparatus according to claim 15, wherein the at least one processor is further configured to:

sequentially use each frame of image in the target video stream as a target image, and decode the target image by using the GPU; and determine to frame-skip the target image when the target image does not comprise a preset type of object.

17. The video stream decoding apparatus according to claim 15, wherein the at least one processor is further configured to restart the target thread, input the target video stream into the GPU by reusing the target thread, and decode the target video stream by using the GPU to obtain the target decoded video data when decoding of the target video stream ends and the target video stream needs to be replayed.

18. The video stream decoding apparatus according to claim 15, wherein the at least one processor is further configured to:

collect the target thread when decoding of the target video stream ends and the target video stream does not need to be replayed.

19. The video stream decoding apparatus according to claim 12, wherein the plurality of pieces of decoded video data further comprises third decoded video data, and the at least one processor is further configured to:

obtain address codes of memories corresponding to the plurality of pieces of decoded video data;

perform a memory map according to the address codes to determine target memories corresponding to the plurality of pieces of decoded video data; and output the plurality of pieces of decoded video data to the respective corresponding target memories.

20. A non-transitory computer readable storage medium storing computer-readable instructions, the computer-readable instructions, when executed by one or more processors, causing the one or more processors to perform operations comprising:

receiving a plurality of video streams;

generating a plurality of threads in a thread pool corresponding to a graphics processing unit (GPU);

transmitting, according to the plurality of threads, the plurality of video streams to the GPU for video decoding processing to obtain a plurality of pieces of decoded video data, the plurality of pieces of decoded video data comprise a first number of pieces of first decoded video data and a second number of pieces of second decoded video data;

identifying a first memory corresponding to the first number of pieces of first decoded video data, and a second memory corresponding to the second number of pieces of second decoded video data, the first memory and the second memory being located outside of the GPU; and outputting, by using the GPU, the first number of pieces of first decoded video data to the first memory and outputting the second number of pieces of second decoded video data to the second memory.

\* \* \* \* \*